United States Patent [19]

Pelin

[11] 4,075,838
[45] Feb. 28, 1978

[54] CLOSED SYSTEM, STANDPIPE OPERATED HYDROELECTRIC POWER PLANT

[76] Inventor: Charles Pelin, R.R. 1, Box 1460, Eastsound, Wash. 98245

[21] Appl. No.: 817,913

[22] Filed: Jul. 22, 1977

[51] Int. Cl.² .......................................... F16D 33/00
[52] U.S. Cl. ...................................... 60/325; 60/398; 290/1 R; 290/4 R
[58] Field of Search ................. 60/325, 327, 398, 495, 60/496; 290/1 R, 1 A, 4 R

[56] References Cited

U.S. PATENT DOCUMENTS

| 271,040 | 1/1883 | Cook | 60/496 |
| 1,751,667 | 3/1930 | Taylor | 60/398 |
| 2,105,624 | 1/1938 | Orlove | 60/398 X |
| 3,991,563 | 11/1976 | Pelin | 60/325 |

Primary Examiner—Edgar W. Geoghegan
Attorney, Agent, or Firm—Christopher Duffy

[57] ABSTRACT

A power plant of the type disclosed in U.S. Pat. No. 3,991,563 is housed in a pressure chamber filled with a body of water having a standpipe relatively upstanding thereabove to pressurize the water.

14 Claims, 3 Drawing Figures

CLOSED SYSTEM, STANDPIPE OPERATED HYDROELECTRIC POWER PLANT

THE INVENTION IN GENERAL

The hydroelectric power generating plant of the present invention employs a generating system similar to that employed in my U.S. Pat. No. 3,991,563. However, the generating system is housed in a pressure chamber filled with a body of water having a standpipe relatively upstanding thereabove to pressurize the water. Casing means define the pressure chamber and the standpipe, and the standpipe has a column of water therein communicating with the water in the chamber. The housing of the generating system is enclosed in the pressure chamber and defines a subchamber therein, and a series of penstocks which open into the body of water in the pressure chamber at points about the perimeter of the housing below the column of water in the standpipe, and which discharge into the subchamber. The hydroelectric power generating means of the system include turbines in the penstocks, and means for discharging the tailwater from the respective turbines including nipples on the housing which communicate with the subchamber and open into the body of water in the pressure chamber at levels below that of the subchamber. The nipples have open-ended thimble-like vessels telescopically engaged thereon, to be extended and retracted in relation to the respective nipples axially thereof. Also, the nipples and vessels have float-operated check valves therein adjacent the subchamber and the end openings of the vessels, respectively, each of which valves is adapted to permit flow in the direction relatively from the subchamber toward the body of water in the pressure chamber when open, and to prevent flow in the opposite direction when closed. Additionally, there are valve means in the tailwater discharge means which are adapted to equalize the pressure in the vessels with that in the body of water in the pressure chamber when the respective check valves in the vessels are closed. Drive means operate to extend and retract the respective vessels, and control means are connected to the drive means and operative through the same (1) to extend and retract and respective vessels in staggered sequence about the circumference of the housing, with each vessel undergoing an at-rest period between the respective retraction and extension stages thereof when the vessel is fully retracted, and (2) to control the rate of extension and retraction of the respective vessels and the length of their respective rest periods, as a function of the water level in the subchamber. The height of the column of water in the standpipe is adapted to drive the turbines, the vessels are each adapted in buoyancy to hover in equilibrium in the body of water in the pressure chamber when at rest, and the number of nipples and vessels is adapted in relation to the number of penstocks and turbines so that the vessels collectively discharge the tailwater from the turbines at a rate adapted to maintain the water level in the subchamber between predetermined limits.

In presently preferred embodiments of the invention, there is a pier upstanding in the pressure chamber which is spaced apart from the sidewalls of the same by an annular moat-like recess therearound, and the housing is supported on the pier with the nipples outstanding therefrom in the recess. Also, the housing is interconnected with the roof of the chamber so as to support the roof on the pier. Preferably, the housing extends radially outwardly from the pier so as to overhang the recess, and the nipples depend from the housing abreast of the pier, normally on vertical axes.

The casing means may be formed or erected so that the pressure chamber is disposed fully below ground level; or alternatively, the casing means may be formed or erected so that only the moat-like recess is disposed below ground level. In either event, the surrounding ground operates to buttress the casing means.

Alternatively, the casing means may be formed or erected in water, such as at a site offshore from a body of land, so that the surrounding water operates to buttress the casing means. Similarly, the casing means may be formed or erected in part in water and in part in land. Forming or erecting it in water eliminates excavation costs; whereas forming or erecting it in land eliminates any buoyancy effect on the same.

The chamber and standpipe may be formed or erected in two stages, as for example where the casing means is partially formed or erected in water and the standpipe is subsequently floated to the site of the same and then swung into position over the pressure chamber.

The standpipe is normally upstanding on the roof of the chamber.

In all cases, the fact of encasing the generating system in a closed environment makes it possible to control the quality and character of the environment. For example, the pressure chamber can be filled with fresh or treated water that will not support marine life; and if desired, the water can be filtered and rendered sterile before it is added to the chamber and the standpipe.

Preferably, the standpipe has valve means therein whereby the standpipe can be hydraulically isolated from the body of water in the pressure chamber when desired. In this way, operating personnel can enter the pressure chamber to maintenance the facility and afterward the facility can be returned to operational condition by opening the valve means.

In the presently preferred embodiments of the invention, the valve means is float-operated. Also, the standpipe has a relatively constricted throat section therein, and the valve means is disposed in the throat section. For example, in certain embodiments the valve means includes a pair of float operated valve devices adjacent the relatively upper and lower ends of the throat section, and the valve devices in turn include valve members which are hollow and adapted to be filled with and emptied of water by way of opening and closing the devices. Means are provided in the power plant to fill and empty the valve members as needed, and typically the valve device adjacent the relatively upper end of the throat section has valve members which are adapted to close the throat section when filled with water, and to open the throat section when emptied of water; whereas the valve device adjacent the relatively lower end of the throat section has valve members which are adapted to open the throat section when filled with water, and to close the throat section when emptied of water.

BRIEF DESCRIPTION OF THE DRAWINGS

These features will be better understood by reference to the accompanying drawings which illustrate one of the presently preferred embodiments of the invention in the situation where the pressure chamber of the power plant is formed or erected below ground and the standpipe is relatively upstanding from the roof of the same.

In the drawings.

DESCRIPTION OF THE PREFERRED EMBODIMENT

Figure 1:
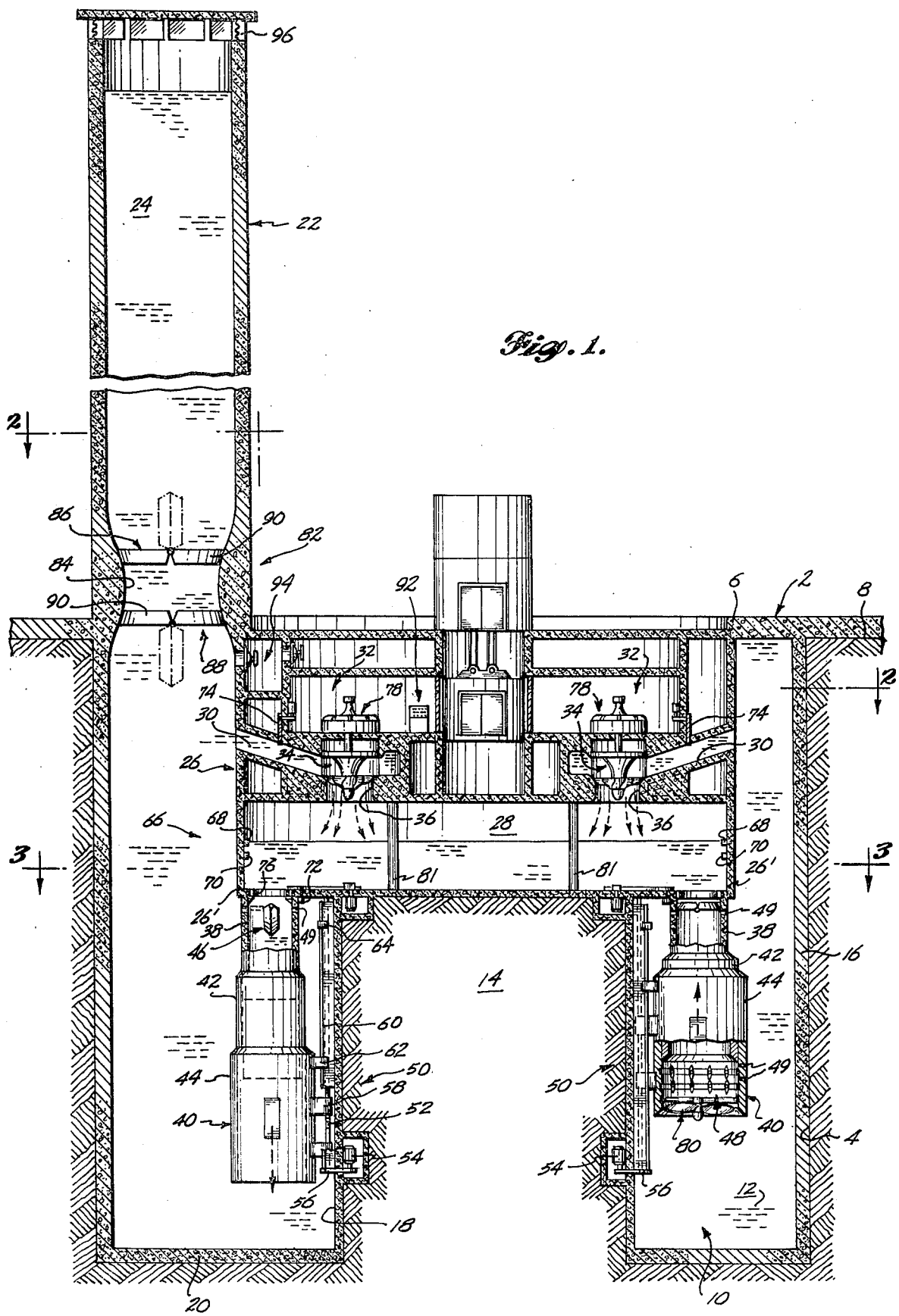
FIG. 1 is a vertical cross-sectional view of the power plant.
Figure 2:
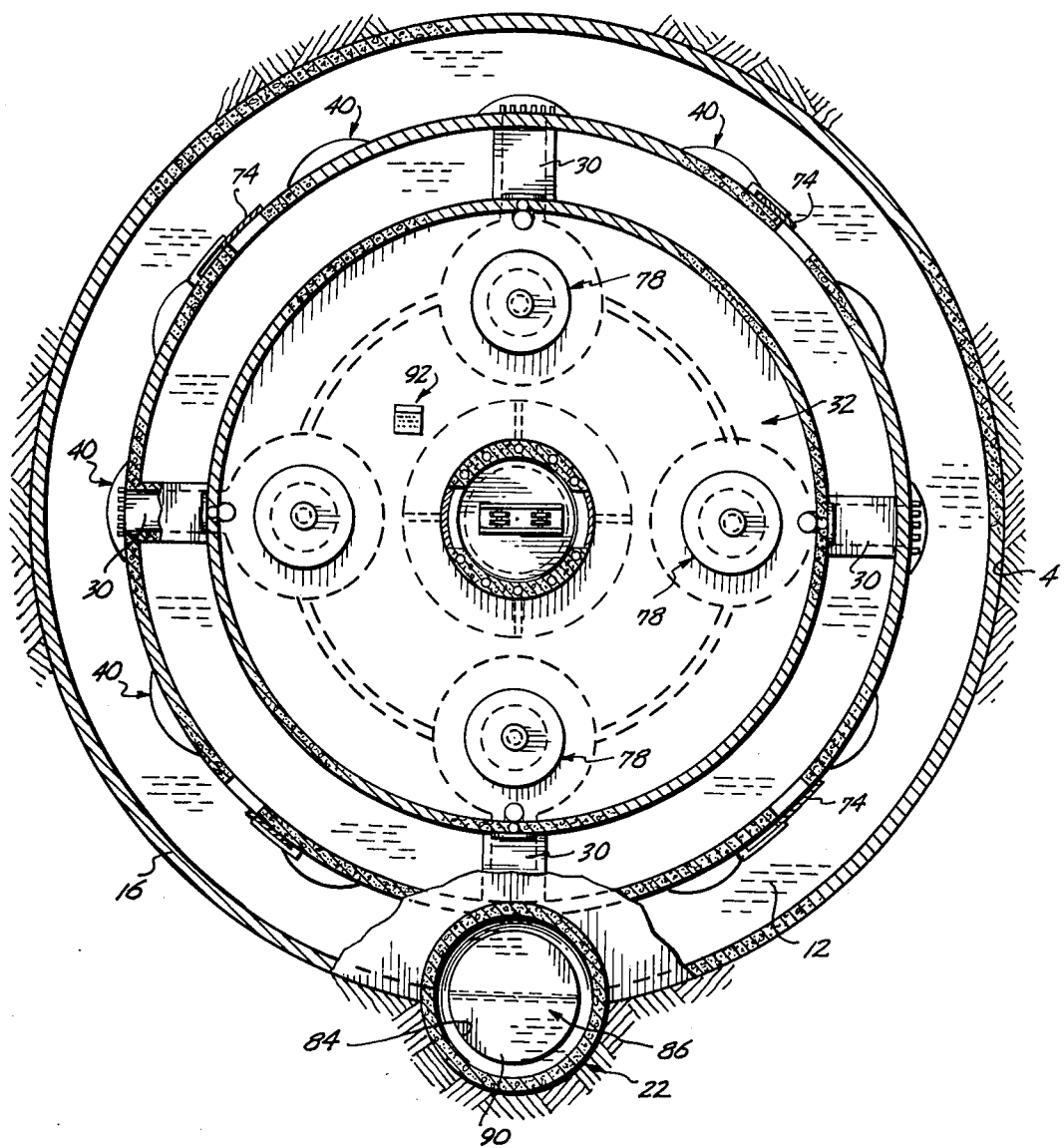
FIG. 2 is a cross-sectional view through the standpipe along the line 2—2 of FIG. 1.
Figure 3:
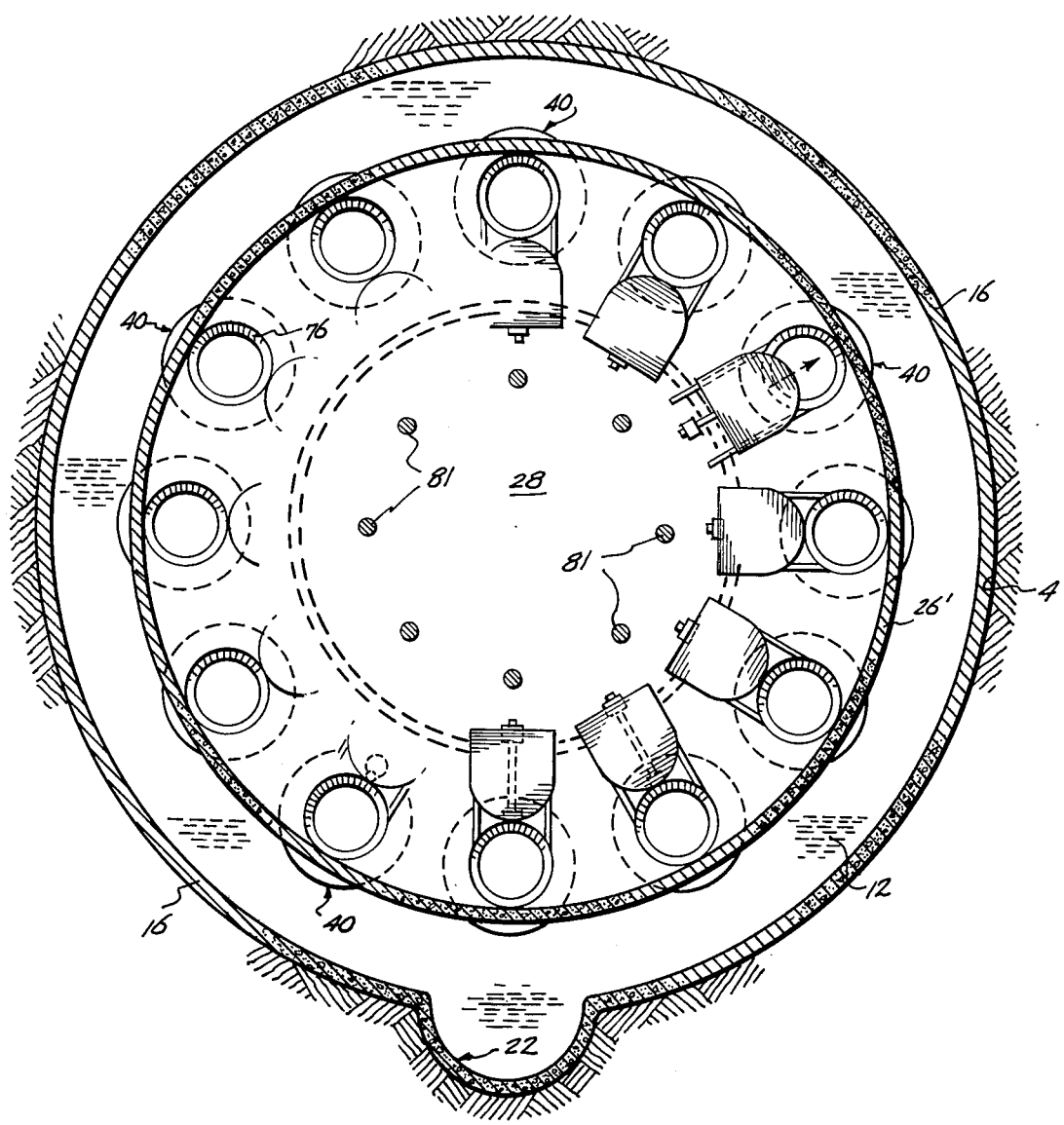
FIG. 3 is a cross-sectional view through the chamber along the line 3—3 of FIG. 1.

Referring to the drawings, it will be seen that the power plant comprises a vault-like cylindrical casing 2 which is formed in an excavation 4 in the ground so that the lid or roof 6 thereof is flush with the surface 8 of the ground. The casing 2 defines a pressure chamber 10 which is filled with a body of water 12 and has a pier 14 upstanding centrally thereof so that the pier is spaced apart from the sidewalls 16 of the chamber by an annular moat-like recess 18 therearound. The walls 16, roof 6, bottom 20 and pier 14 of the casing are all formed from reinforced concrete and have thick cross-sections adapted to withstand considerable pressure in the body of water. The pressure is generated by a cylindrical standpipe 22 which is relatively upstanding from the roof of the casing above the chamber 10 and has a column of water 24 therein communicating with the body of water 12 in the chamber 10. The standpipe 22 has a thick concrete cross-section integral with that of the roof, but it is disposed adjacent the perimeter of the casing so that the outside radius of the standpipe extends beyond that of the recess 18 as seen in FIGS. 2 and 3.

The power plant also comprises a cylindrical housing 26 which is supported on the pier 14 between the pier and the roof 6 of the casing so as to be enclosed in the pressure chamber 10. The housing is also interconnected with the roof so as to support it on the pier, and extends radially outwardly from the pier so as to overhang the recess 18. The housing defines an interior subchamber 28 and a series of penstocks 30 which open into the body of water 12 in the pressure chamber at points spaced about the perimeter of the housing below the column of water 24 in the standpipe, and which discharge into the subchamber. The penstocks 30 are accompanied by hydroelectric power generating means 32 that include turbines 34 which are disposed in the respective penstocks and discharge their tailwater into the subchamber 28 through a corresponding series of vertical draft tubes 36. The tailwater is discharged from the subchamber in turn by a series of nipples 38 on the housing which communicate with the subchamber and depend from the overhanging portion 26' of the housing 26 on vertical axes abreast of the pier. The nipples 38 open into the water 12 in the pressure chamber at levels below that of the subchamber 28 and have open-ended thimble-like vessels 40 telescopically engaged thereon, which are adapted to be extended and retracted in relation to the respective nipples, axially thereof, to disperse the tailwater as it accumulates in the subchamber.

Each vessel 40 comprises a plurality of relatively telescopically engaged tubular members 42 and 44, the innermost of which, 42, is telescopically engaged on the corresponding nipple. The nipples and vessels have float-operated check valves 46 and 48 therein, adjacent the subchamber and end openings of the vessels, respectively, and each of the check valves is adapted to permit flow in the direction relatively from the subchamber toward the body of water in the pressure chamber when open, and to prevent flow in the opposite direction when closed. There are also additional valve means 49 on the nipples 38 and the outermost tubular members 44, which are adapted to equalize the pressure in the respective vessels with that in the body of water 12 when the respective check valves 48 in the vessels are closed.

The vessels 40 are extended and retracted by a corresponding number of drive means 50 housed between the vessels and the pier. Each drive means includes a drive screw 52 on a parallel with the axis of the corresponding nipple. The screw is driven by a motor 54 in the pier through a variable gear box 56, and is interconnected with the vessel through an arm 58 on the outer tubular member 44. The screw is engaged in a bushing (not shown) on the arm, and the bushing is threaded to convert the rotation of the screw into translatory motion on the part of the member 44 and thus the vessel. The motion is guided by a pair of interdigitating rails 60 and arms 62 on the housing and the respective outer tubular member 44. Stops 64 limit the motion of the member.

The subchamber 28 has control means 66 associated therewith, including a pair of water level sensors 68 and 70, and a reversing switch 72, which are connected to the respective drive means 50 so as to extend and retract the vessels in staggered sequence to one another about the circumference of the housing, with each vessel undergoing an at-rest period between the respective retraction and extension stages thereof when the vessel is fully retracted. The control means 66 also control the rate of extension and retraction of the vessels, and the length of their respective rest periods, as a function of the water level in the subchamber. In addition, each penstock 30 has a throttle valve 74 therein to control the rate of flow therethrough, and the number of nipples and vessels is adapted in relation to the number of penstocks and turbines so that the vessels collectively discharge the tailwater from the turbines at a rate adapted to maintain the water level in the subchamber between limits corresponding to the levels of the sensors 68 and 70.

Each vessel 40 is also constructed so that the vessel is adapted in buoyancy to hover in equilibrium in the body of water 12 when at rest. For example, each vessel may have a series of hermetically sealed tubes (not shown) therein, the volume of which is in such proportion to the weight of the concrete or other material forming the vessel, that the displacement volume of the vessel equals the same volume of water in weight. See my U.S. Pat. No. 3,991,563. The tubular member 42 is sealed and has a fixed buoyancy factor, whereas member 44 is equipped with trim tanks (not shown) having intakes and outlets by which the weight of the vessel can be adjusted from time to time as required. Electrical circuitry (not shown) is built into the walls of the vessels and is closed when the vessel is retracted and at rest so that the trim tank adjustment can be accomplished from a central control room.

The height of the column of water 24 in the standpipe 22 is adapted to drive the turbines 34. Initially when the power plant is put into operation, all of the vessels 40 are fully retracted over the nipples 38 and filled with water. The subchamber 28, however, is empty. When the valves 74 are opened and water is released into the penstocks 30, the tailwater from the turbines discharges into the subchamber and accumulates to the high level control sensor 68. At this point the control means 66 activates the drive means 50 which in turn drives the vessels in staggered sequence to one another as mentioned. As each vessel undergoes extension, the valve 48 remains closed and the valve 46 remains open and allows the water in the subchamber to accumulate in the vessel, thus maintaining the necessary equilibrium condition for that vessel. Ultimately, when the vessel is fully extended, the valve 46 floats into its closed position and closes the adjacent opening 76 between the nipple and the subchamber. As it closes moreover, the valve 46 activates the switch 72 to reverse the respective drive means 50 for the vessel. The vessel then undergoes retraction and as it does, the valve 48 opens to convert the vessel into a bottomless tube. Subsequently, when the vessel is fully retracted over the nipple, the valve 48 floats into its closure position and closes the open end of the vessel, thus reforming the vessel as a closed tube.

Should the water level in the subchamber 28 require a change in the sequencing of the vessels, the control means 66 accomplishes this, for example, by shortening or lengthening the rest period of the vessels, thus changing the rate at which the subchamber is drained. In any event, the subchamber is continuously drained and hydroelectric power is generated in a set of generators 78 as new water is added to the subchamber through the turbines 34. The generating power is employed in part to drive the motors 54 through electrical connections passing through standards 81 in the subchamber.

The vessels are equipped with propeller means 80 for increasing the forward thrust of the same in the direction of their extension. Again, see my U.S. Pat. No. 3,991,563.

The standpipe 22 has valve means 82 therein whereby the standpipe can be hydraulically isolated from the body of water 12 in the pressure chamber 10, and alternatively hydraulically interconnected with said body. As seen, the valve means 82 is float operated and installed in a relatively constricted throat section 84 in the standpipe.

More specifically, the valve means 82 includes a pair of float operated valve devices 86 and 88 adjacent relatively upper and lower ends of the throat section. The devices include pairs of hingedly mounted valve members 90 which are hollow and adapted to be filled with and emptied of water by way of opening and closing the devices. Control means are provided at 92 in a central control room, whereby the valve members can be filled and emptied as needed. The valve device 86 adjacent the relatively upper end of the throat section has valve members 90 which are adapted to close the throat section 84 when filled with water, and to open the throat section when emptied of water. The valve device 88 adjacent the relatively lower end of the throat section has valve members 90 which are adapted to open the throat section when filled with water, and to close the throat section when emptied of water. Personnel enter the chamber 10 below the valve means 82 through a pressurizable entry room 94 communicating with the chamber.

The top of the standpipe is capped by has screened openings 96 therein. The pipe might also have internal reinforcement such as cross-ties (not shown).

The remaining features of the power plant are similar to those seen in my foregoing Patent, and the disclosure of the latter is hereby incorporated by reference herein.

What is claimed is:

1. In combination, casing means defining a pressure chamber filled with a body of water and a standpipe relatively upstanding thereabove having a column of water therein communicating with the water in the chamber, a housing enclosed in the pressure chamber and defining a subchamber therein and a series of penstocks which open into the body of water in the pressure chamber at points about the perimeter of the housing below the column of water in the standpipe, and which discharge into the subchamber, hydroelectric power generating means including turbines in the penstocks and means for discharging the tailwater from the respective turbines including nipples on the housing which communicate with the subchamber and open into the body of water in the pressure chamber at levels below that of the subchamber, and which have open-ended thimble-like vessels telescopically engaged thereon, to be extended and retracted in relation to the respective nipples axially thereof, said nipples and vessels having float-operated check valves therein adjacent the subchamber and the end openings of the vessels, respectively, each of which valves is adapted to permit flow in the direction relatively from the subchamber toward the body of water in the pressure chamber when open, and to prevent flow in the opposite direction when closed, there being additional valve means in the tailwater discharge means which are adapted to equalize the pressure in the vessels with that in the body of water in the pressure chamber when the respective check valves in the vessels are closed, drive means for extending and retracting the respective vessels, and control means which are connected to the drive means and operative through the same (1) to extend and retract the respective vessels in staggered sequence about the circumference of the housing, with each vessel undergoing an at-rest period between the respective retraction and extension stages thereof when the vessel is fully retracted, and (2) to control the rate of extension and retraction of the respective vessels and the length of their respective rest periods, as a function of the water level in the subchamber, the height of the column of water in the standpipe being adapted to drive the turbines, the vessels each being adapted in buoyancy to hover in equilibrium in the body of water in the pressure chamber when at rest, and the number of nipples and vessels being adapted in relation to the number of penstocks and turbines so that the vessels collectively discharge the tailwater from the turbines at a rate adapted to maintain the water level in the subchamber between predetermined limits.

2. The combination according to claim 1 wherein there is a pier upstanding in the pressure chamber which is spaced apart from the sidewalls of the same by an annular moat-like recess therearound, and the housing is supported on the pier with the nipples outstanding therefrom in the recess.

3. The combination according to claim 2 wherein the housing is interconnected with the roof of the chamber so as to support the roof on the pier.

4. The combination according to claim 2 wherein the housing extends radially outwardly from the pier so as to overhang the recess, and the nipples depend from the housing.

5. The combination according to claim 4 wherein the nipples are disposed on vertical axes.

6. The combination according to claim 1 wherein the pressure chamber is disposed below ground level.

7. The combination according to claim 2 wherein the moatlike recess is disposed below ground level.

8. The combination according to claim 1 wherein the standpipe is upstanding on the roof of the chamber.

9. The combination according to claim 1 wherein the standpipe has valve means therein whereby the standpipe can be hydraulically isolated from the body of water in the basin when desired.

10. The combination according to claim 9 wherein the valve means if float-operated.

11. The combination according to claim 9 wherein the standpipe has a relatively constricted throat section therein and the valve means is disposed in the throat section.

12. The combination according to claim 11 wherein the valve means includes a pair of float-operated valve devices adjacent the relatively upper and lower ends of the throat section.

13. The combination according to claim 12 wherein the valve devices include valve members which are hollow and adapted to be filled with and emptied of water by way of opening and closing the devices, means operable to fill and empty the valve members as needed.

14. The combination according to claim 13 wherein the valve device adjacent the relatively upper end of the throat section has valve members which are adapted to close the throat section when filled with water, and to open the throat section when emptied of water, and the valve device adjacent the relatively lower end of the throat section has valve members which are adapted to open the throat section when filled with water, and to close the throat section when emptied of water.

* * * * *